(12) United States Patent
Braun et al.

(10) Patent No.: US 10,914,197 B2
(45) Date of Patent: Feb. 9, 2021

(54) CASING OF A TURBOCHARGER AND TURBOCHARGER

(71) Applicant: MAN ENERGY SOLUTIONS SE, Augsburg (DE)

(72) Inventors: Steffen Braun, Augsburg (DE); Daniel Albrecht, Augsburg (DE); Harald Denkel, Baar (DE); Stefan Weihard, Augsburg (DE); Bernd Haas, Neusäß (DE); Johannes Niebuhr, Augsburg (DE); Urban Spatz, Neusäß (DE)

(73) Assignee: MAN Energy Solutions SE, Augsburg (DE)

( * ) Notice: Subject to any disclaimer, the term of this patent is extended or adjusted under 35 U.S.C. 154(b) by 92 days.

(21) Appl. No.: 16/269,276

(22) Filed: Feb. 6, 2019

(65) Prior Publication Data

US 2019/0242272 A1 Aug. 8, 2019

(30) Foreign Application Priority Data

Feb. 7, 2018 (DE) .......................... 10 2018 102 697

(51) Int. Cl.
| | | |
|---|---|---|
| F01D 25/26 | (2006.01) | |
| F01D 25/28 | (2006.01) | |
| F02C 6/12 | (2006.01) | |
| F02C 7/24 | (2006.01) | |

(52) U.S. Cl.
CPC ........... *F01D 25/265* (2013.01); *F01D 25/28* (2013.01); *F02C 6/12* (2013.01); *F02C 7/24* (2013.01); *F05D 2220/40* (2013.01); *F05D 2240/14* (2013.01)

(58) Field of Classification Search
CPC ...... F01D 21/045; F01D 25/145; F01D 25/28; F01D 25/26; F01D 25/265; F02C 6/12; F02C 7/24; F05D 2220/40; F05D 2240/14
See application file for complete search history.

(56) References Cited

U.S. PATENT DOCUMENTS

| | | | | |
|---|---|---|---|---|
| 3,942,907 A | * | 3/1976 | Meylan ................... | F01D 25/26 415/126 |
| 5,219,461 A | * | 6/1993 | Hyll ..................... | F04D 29/4286 264/255 |
| 5,555,647 A | * | 9/1996 | Torborg .................. | F06F 58/04 34/601 |
| 6,193,463 B1 | * | 2/2001 | Adeff .................... | F04D 29/023 415/196 |
| 7,001,149 B1 | * | 2/2006 | Waggoner ........... | F04D 29/4226 415/204 |
| 7,785,068 B2 | * | 8/2010 | Rao K V ................ | F01D 25/26 29/888.025 |
| 7,861,708 B1 | * | 1/2011 | Lyons ................... | F04D 29/668 126/104 A |

(Continued)

*Primary Examiner* — Igor Kershteyn
(74) *Attorney, Agent, or Firm* — Cozen O'Connor

(57) ABSTRACT

A casing of a turbocharger, which surrounds a housing to be encased such as a turbine housing and/or a compressor housing and/or a bearing housing of the turbocharger at least in sections, with axial casing segments, which axially adjoin the housing to be encased, with at least one radial casing segment, which radially adjoins the housing to be encased radially outside, and at least one stiffening element is formed or acts on at least one casing segment.

10 Claims, 3 Drawing Sheets

(56) References Cited

U.S. PATENT DOCUMENTS

| | | | | |
|---|---|---|---|---|
| 8,342,800 B2* | 1/2013 | Cvjeticanin | ............. | B29C 45/14 |
| | | | | 415/200 |
| 2004/0223847 A1* | 11/2004 | Cvjeticanin | ........... | B29C 66/547 |
| | | | | 415/206 |
| 2019/0186498 A1* | 6/2019 | Haaf | .................... | F04D 29/281 |

* cited by examiner

CASING OF A TURBOCHARGER AND TURBOCHARGER

BACKGROUND OF THE INVENTION

1. Field of the Invention

The invention relates to a casing of a turbocharger and to a turbocharger.

2. Description of the Related Art

The fundamental construction of a turbocharger is known to the person skilled in the art addressed here. A turbocharger comprises a turbine, in which a first medium is expanded and a compressor, in which a second medium is compressed utilising the energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned. The bearing housing is connected to the turbine housing and to the compressor housing. In the bearing housing, a shaft is mounted, via which the turbine rotor is coupled to the compressor rotor.

During operation of a turbocharger there is a danger that a rotor, for example the turbine rotor or the compressor rotor of the turbocharger, breaks and fragments of the rotor strike through the relevant housing, i.e. the turbine housing or the compressor housing. There is then the danger that the fragments of the turbocharger enter the surroundings. In order to take into account this problem of the bursting of a rotor of the turbocharger, the respective housing, in turbochargers known from practice, is designed in such a manner that a failure of the respective housing need not be expected and even in the event of the breaking of the respective rotor, fragments of the same cannot strike through the respective housing. However, the weight of the turbocharger is increased because of this.

So as not to unnecessarily increase the weight of the turbocharger and moreover protect turbochargers already employed in the field from fragments of a rotor striking through into the surroundings it is already known to equip a turbocharger with a casing, which surrounds a turbine housing and/or a compressor housing and/or a bearing housing of the turbocharger radially outside and axially outside at least in sections.

Casings for turbochargers known from practice comprise axial casing segments, which on axial sides of the housing to be encased adjoin the housing to be encased axially outside. Furthermore, casings known from practice comprise at least one radial casing segment which adjoins the housing to be encased radially outside and extends between axial casing segments located opposite one another.

Casings known from practice with axial casing segments and at least one radial casing segment substantially have a U-shape in the cross section. Although such a U-shape is preferred based on low manufacturing costs and low component complexity, the vibration excitation of such casing is disadvantageous. There is therefore a need for a casing of a turbocharger which with low weight and low component complexity has a lower tendency towards vibrations during the operation of the turbocharger.

SUMMARY OF THE INVENTION

One aspect of the invention is based on creating a new type of casing of a turbocharger and a turbocharger having such a casing.

On at least one casing element, at least one stiffening element is formed or at least one stiffening element acts on at least one casing element. Thus, the structural stiffness of the casing can be improved with low component complexity and low manufacturing costs. The danger that the casing has a tendency towards vibrations during the operation of the turbocharger is reduced.

Preferentially, multiple rib-like or impression-like stiffening elements are formed on at least one axial casing segment or multiple stiffening elements act on at least one axial casing segment. Rib-like or impression-like stiffening elements on at least one axial casing segment are particularly preferred for increasing the structural stiffness of the casing and for reducing the vibration tendency of the casing.

Preferentially, first stiffening elements are formed on an outside and/or second stiffening elements on an inside of the respective axial casing segment. Particularly preferable is a configuration of the stiffening elements if the same extend both in the radial direction and also in the axial direction thus forming clamp-like ribs, which extend along two axial casing segments located opposite one another in the radial direction and along a radial casing segment positioned between the same in the axial direction. By way of this, the structural stiffness can be particularly advantageously increased and the vibration tendency of the casing reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this.

There it shows.

DETAILED DESCRIPTION OF THE PRESENTLY PREFERRED EMBODIMENTS

The invention relates to a casing of a turbocharger and to a turbocharger having a casing.

The person skilled in the art addressed here is familiar with the fundamental construction of a turbocharger. Accordingly, a turbocharger comprises a turbine for expanding a first medium, in particular for expanding exhaust gas, and a compressor for compressing a second medium, in particular for compressing charge air, namely utilising the energy extracted in the turbine during the expansion of the first medium.

The turbine comprises a turbine rotor and a turbine housing. The compressor comprises a compressor rotor and a compressor housing. The turbine rotor and the compressor rotor are coupled via a shaft mounted in a bearing housing of the turbocharger, wherein the bearing housing is connected to both the turbine housing and also to the compressor housing.

In particular when during the operation the turbine rotor or the compressor rotor breaks, fragments of the same can strike through the respective housing, i.e. the turbine housing or the compressor housing, and enter the surroundings. This has to be avoided and it is known to equip a turbocharger with a casing that surrounds the turbine housing and/or the compressor housing and/or the bearing housing of the turbocharger.

Preferentially, a separate casing is employed in each case in the region of the turbine housing and of the compressor housing, which surrounds the respective housing of the turbocharger to be encased radially outside and axially outside at least in sections.

A casing serves not only for providing a burst protection but can also serve for the thermal insulation and sound insulation.

Figure 1:
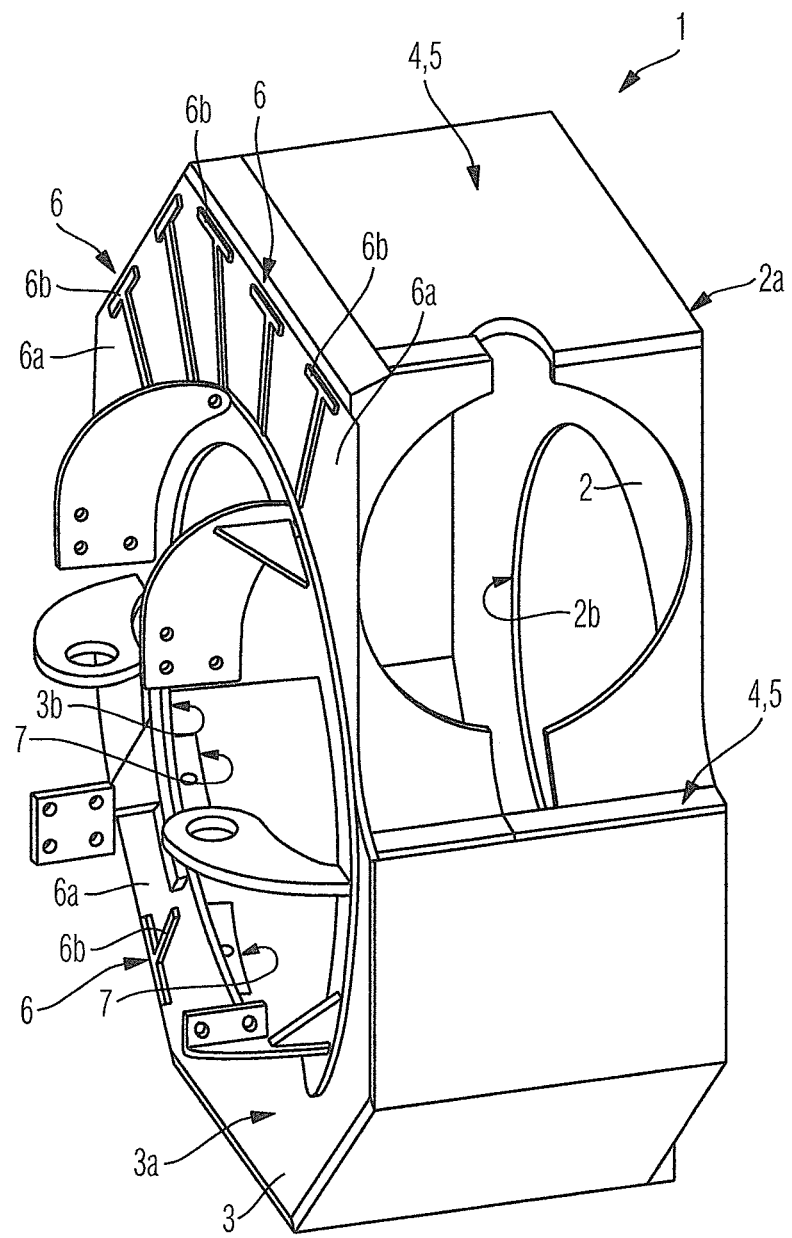
FIG. 1 is a perspective view of a casing for a turbocharger.

FIG. 1 shows a perspective view of a casing 1 for a housing of a turbocharger, for example for a turbine housing or compressor housing of a turbocharger which is not shown.

The casing 1 comprises axial casing segments 2 and 3 located opposite one another, wherein on each axial side of a housing to be encased an axial casing segment 2, 3 is arranged on the outside adjoining the housing.

In addition to this, the casing 1 comprises at least one radial casing segment 4, 5, which extends between axial casing segments 2, 3 located opposite one another and adjoins the respective housing to be encased radially outside.

Particularly preferred are embodiments in which two radial casing segments are present, which overlap seen in the radial direction. In this case, a first radial casing segment 4 then extends, starting out from the axial casing segment 2, in the direction of the second axial casing segment 3 and starting out from the second axial casing segment 3, a second radial casing segment 5 in the direction of the first axial casing segment 2. The radial casing segments 4, 5 overlapping one another can then be connected to one another.

In order to reduce the vibration susceptibility of the casing it is proposed that at least one stiffening element is formed or acts on at least one casing segment.

In the exemplary embodiment shown in FIG. 1, multiple stiffening elements are formed in each case on the axial casing segment 3, namely on an outside 3a of the same and on an inside 3b of the same, namely on the outside 3a first stiffening elements 6 and on the inside 3b second stiffening elements 7. Such stiffening elements can also be formed on the outside 2a and the inside 2b of the axial casing segment 2 located opposite.

The first stiffening elements 6 formed on the outside 3a of the axial casing segment 3 have a T-shaped contouring with first sections 6a, which extend in the radial direction, and with second sections 6b, which extend in the circumferential direction. Accordingly, these stiffening elements 6 form T-shaped ribs. On the inside 3b of the axial casing segment 3, the second stiffening elements 7 are formed which are preferentially wedge-shaped. These wedge-shaped stiffening elements 7 act on the inside 3b of the axial casing segment 3 and on an inside 4b, 5b of an adjoining radial casing segment 4, 5.

The first stiffening elements 6, which are formed on the outside 3 of the axial casing segment 3 face away from the housing to be encased. The second stiffening elements 7, which are formed on the inside 3b of the axial casing segment 3, face towards the housing to be encased.

Figure 2:
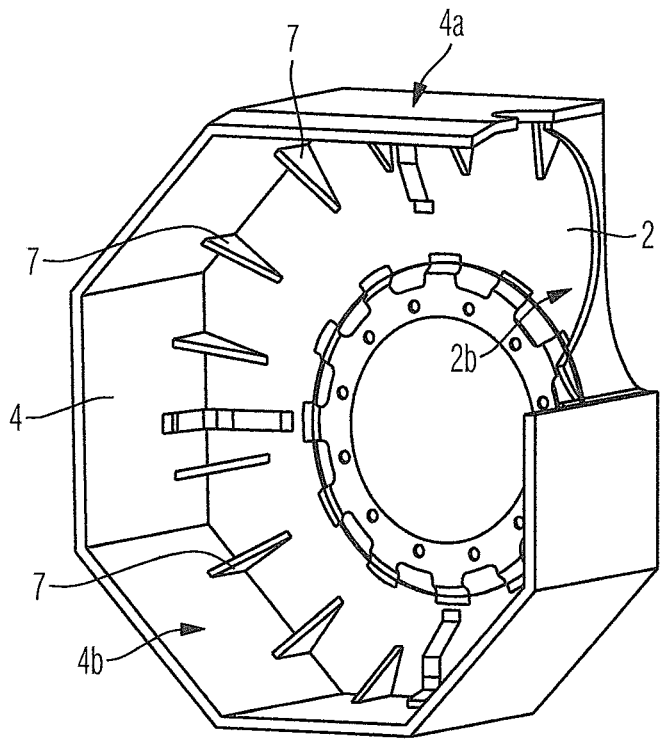
FIG. 2 is a perspective view from inside of a detail the casing.

FIG. 2 shows a view from the inside of an axial casing segment 2 and an adjoining radial casing segment 4 of a casing, wherein in FIG. 2 wedge-shaped second stiffening elements 7 formed on the inside 2b of the axial casing segment 2 are visible. These wedge-shaped second stiffening elements 7 substantially extend in the radial direction and the axial direction. These wedge-shaped second stiffening elements 7 on the one hand act on the inside 2b of the axial casing segment 2 and on the other hand on the inside 4b of the radial casing segment 4.

Figure 3:
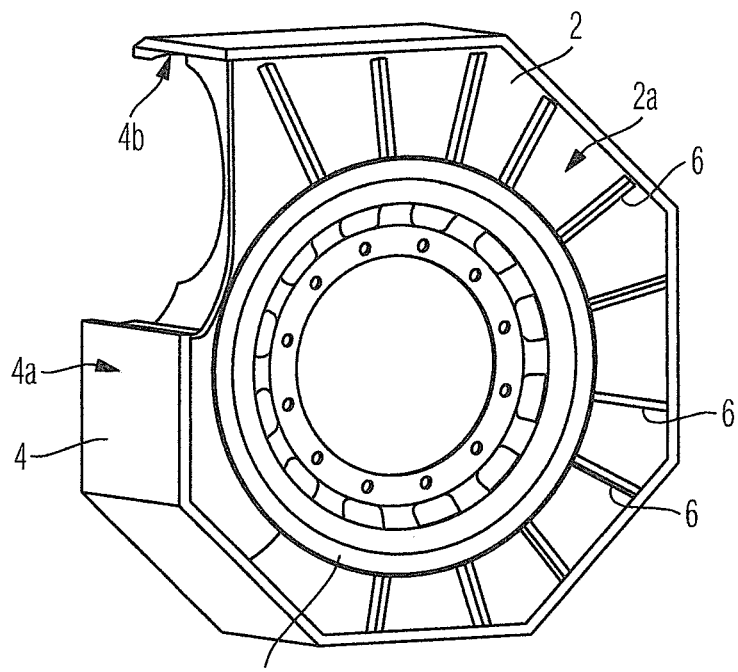
FIG. 3 is a perspective view from outside of a detail of the casing.

FIG. 3 shows a view from the outside of an outside 2a of an axial casing segment 2 and of an outside 4a of an adjoining radial casing segment 4. Here, multiple first stiffening elements 6 are again formed on the outside 2a of the axial casing segment 2, which extend in the radial direction, and which with their radially inner ends adjoin a closed circumferential stiffening element 8 in the circumferential direction.

In the shown exemplary embodiments, all stiffening elements 6, 7 and 8 are formed by rib-like structures. It is also possible to form corresponding stiffening elements through impressions.

Stiffening elements formed as impressions are integrally formed on the respective casing segment.

Stiffening elements 6, 7, and 8 formed as ribs can be integrally formed on the respective casing segment or be embodied as separate assembly and connected to the same preferentially by welding or riveting or screwing.

In a version of the invention it is provided that stiffening elements formed on an outside of the casing 1 extend clamp-like about the casing segments, namely about two axial casing segments 2, 3 located opposite one another and via a radial casing segment 4, 5 extending between these. In this case, the clamp-like stiffening elements then extend in the region of the axial casing segments 2 and 3 on an outside 2a and 3a of the same in the radial direction and in the region of the or a radial casing segment 4 or 5 positioned radially outside on an outside 4a or 5a of the same in the axial direction. With such clamp-like stiffening elements in the region of the outside of the casing 1 and thus of the outside of the casing segments 2, 3, 4, 5, the structural stiffness of the casing 1 can be particularly advantageously increased.

Such clamp-stiffening elements can also be formed on insides of the axial casing segments 2 and 3 and of a radial casing segment 4 or 5. In this case, the clamp-like stiffening elements then extend in the region of the axial casing segments 2 and 3 on an inside 2b and 3b of the same in the radial direction and in the region of the or a radial casing segment 4 or 5 positioned radially inside on an inside 4b or 5b of the same in the axial direction.

The stiffening elements can be regularly distributed over the respective casing segment or be provided only on selected regions of the same.

The invention, furthermore, relates to a turbocharger having a casing which is preferentially arranged round about a turbine inflow housing of turbine housing of a turbine of the turbocharger. However, the casing can also be employed in the region of a compressor housing of the turbocharger.

Figure 4:
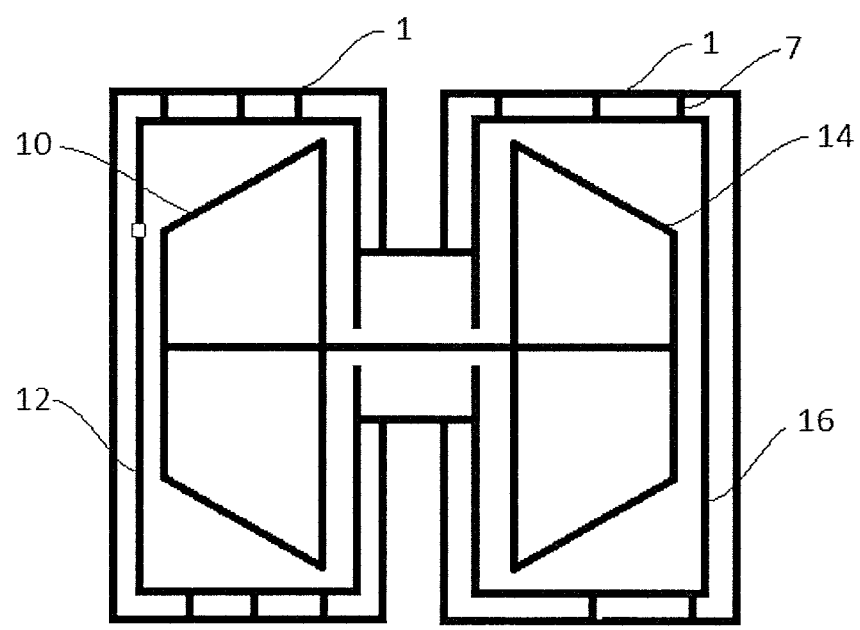
FIG. 4 is a schematic representation of a turbocharger with a casing.

As shown in FIG. 4, a turbocharger comprises a turbine for expanding a first medium and a compressor for compressing a second medium. The turbine comprises a turbine rotor 10 and a turbine housing 12. The compressor comprises a compressor rotor 14 and a compressor housing 16. The turbine rotor and the compressor rotor are coupled via a shaft which is mounted in a bearing housing of the turbocharger, wherein the bearing housing is connected to both the turbine housing and also to the compressor housing. The turbocharger is shown with a casing 1 with second stiffening elements 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A casing of a turbocharger, configured to surround a housing to be encased at least in sections, comprising:
    at least one axial casing segment configured to adjoin the housing to be encased axially outside and having an axially inner facing side arranged to face the housing to be encased;
    at least one radial casing segment configured to adjoin the housing to be encased radially outside and having a radially inner facing side arranged to face the housing to be encased; and
    at least one stiffening element that is one of formed on and acts on at least one of the axially inner facing side of at least one axial casing segment and the radially inner facing side of at least one radial casing segment.

2. The casing according to claim 1, wherein multiple stiffening elements are present.

3. The casing according to claim 2, wherein first stiffening elements of the multiple stiffening elements are one of formed on and act on an outside of a respective axial casing segment.

4. The casing according to claim 3, wherein the first stiffening elements are embodied as ribs or impressions that extend in a radial direction at least in sections.

5. The casing according to claim 3, wherein the first stiffening elements are embodied as ribs or impressions extending in a circumferential direction at least in sections.

6. The casing according to claim 1, wherein the at least one stiffening element are clamp-like and extend in a radial direction along respective axial casing segments located opposite and in an axial direction along a radial casing segment positioned between the same.

7. The casing according to claim 1, wherein the casing is configured to surround a housing by about 270°.

8. A casing of a turbocharger, configured to surround a housing to be encased at least in sections, comprising:
    at least one axial casing segment configured to adjoin the housing to be encased axially outside;
    at least one radial casing segment configured to adjoin the housing to be encased radially outside;
    at least one stiffening element that is one of formed on and acts on at least one of the at least one axial casing segment and the at least one radial casing segment; and
    second stiffening elements formed or act on an inside of a respective axial casing segment,
    wherein the second stiffening elements are wedge-shaped and are formed on or act on an inside of a respective axial casing segment and on an inside of an adjoining radial casing segment.

9. A turbocharger, comprising:
    a turbine for expanding a first medium;
    a compressor for compressing a second medium utilising energy extracted in the turbine during expansion of the first medium;
    a turbine housing of the turbine;
    a compressor housing of the compressor;
    a bearing housing arranged between and connected to the turbine housing and the compressor housing; and
    a casing comprising:
    at least one axial casing segment configured to adjoin at least one of the turbine housing and the compressor housing to be encased axially outside;
    at least one radial casing segment configured to adjoin at least one of the turbine housing and the compressor housing to be encased radially outside; and
    at least one stiffening element that is one of formed on and acts on at least one of the at least one axial casing segment and the at least one radial casing segment.

10. A casing of a turbocharger, configured to surround a housing to be encased at least in sections, comprising:
    at least one axial casing segment configured to adjoin the housing to be encased axially outside;
    at least one radial casing segment configured to adjoin the housing to be encased radially outside; and
    at least one stiffening element that is one of formed on and acts on at least one of the at least one axial casing segment and the at least one radial casing segment,
    wherein the housing to be encased is one of a turbine housing, and/or a compressor housing, and/or a bearing housing of the turbocharger.

* * * * *